UNITED STATES PATENT OFFICE.

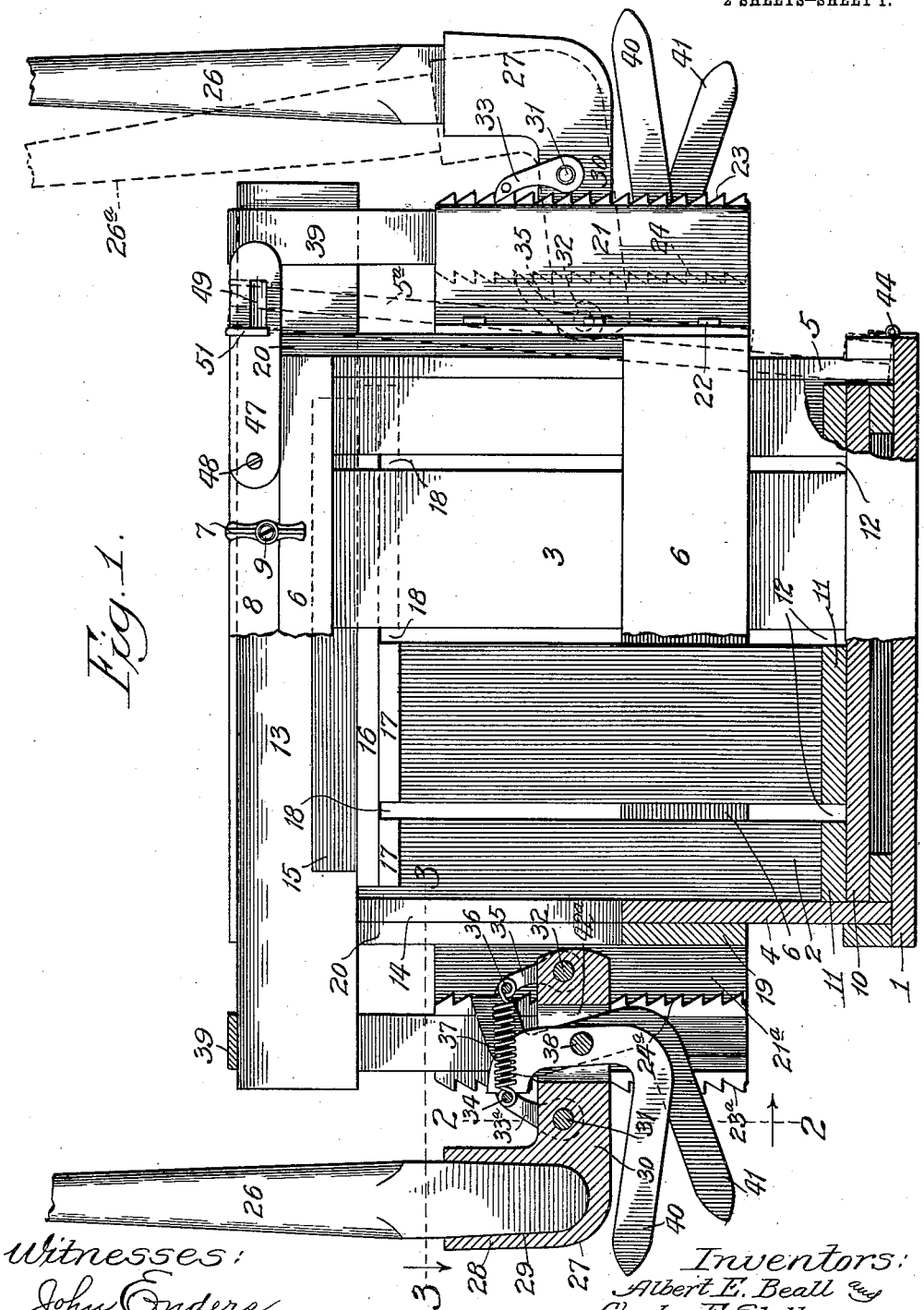

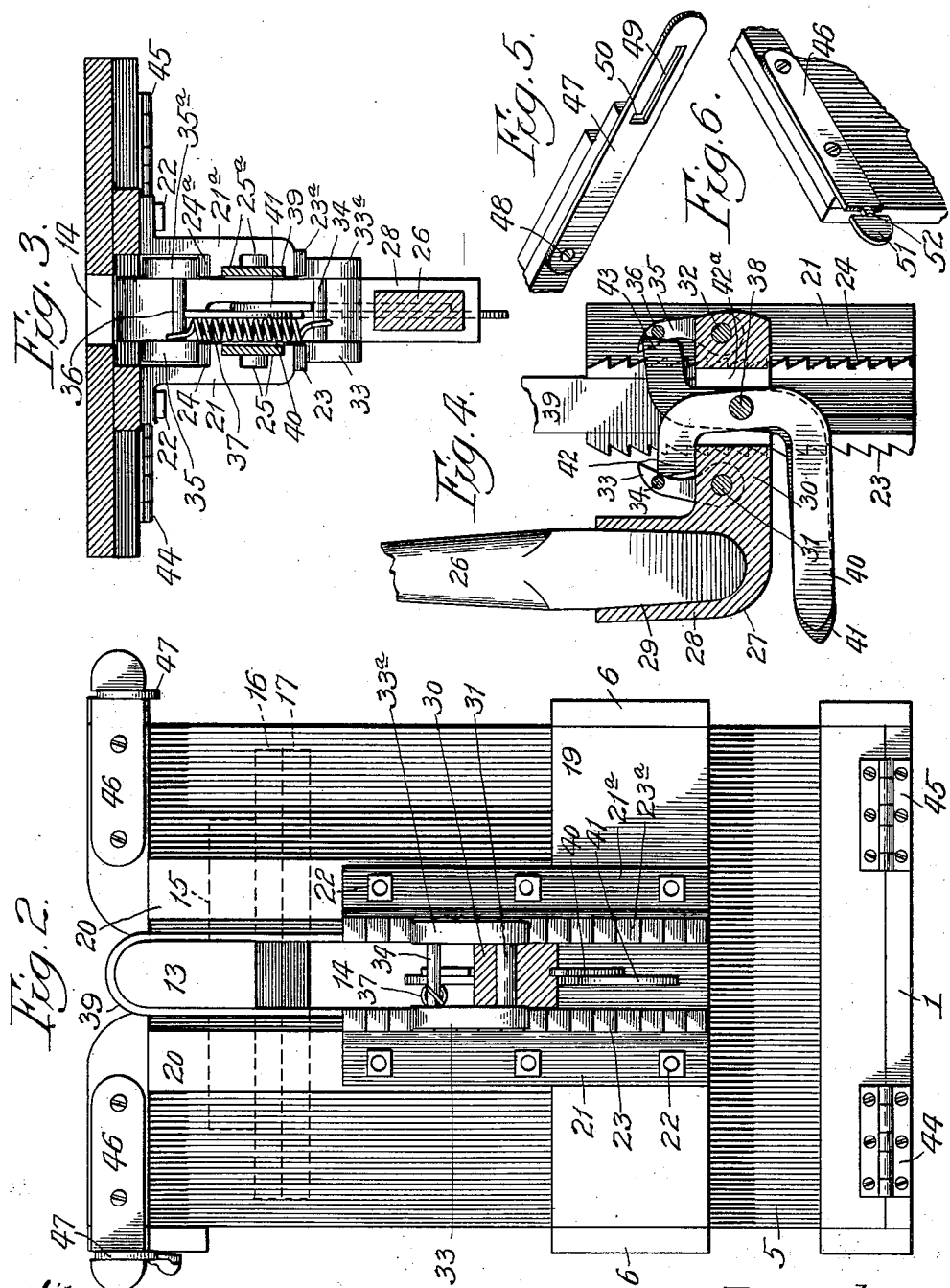

ALBERT E. BEALL AND CHARLES F. SKELLENGER, OF CLINTON, IOWA, ASSIGNORS TO JAMES C. SMITH.

PAPER-BALER.

1,023,984.   Specification of Letters Patent.   Patented Apr. 23, 1912.

Application filed March 6, 1911. Serial No. 612,691.

*To all whom it may concern:*

Be it known that we, ALBERT E. BEALL and CHARLES F. SKELLENGER, citizens of the United States, residing at Clinton, in the county of Clinton and State of Iowa, have invented new and useful Improvements in Paper-Balers, of which the following is a specification.

Our invention relates to paper balers and has for its object the provision of a baler in which the mechanism for operating the follower is simple in construction and effective in operation.

Broadly considered, our new and improved operating mechanism for the follower consists of a pair of bell cranks associated with rack mechanism at each end of the baler frame and adapted to be moved downwardly step by step by a rocking motion in and out. Suitable means is provided for disengaging the bell cranks from the rack mechanism to permit the levers to be moved upwardly to initial position.

Another feature of our invention consists in having one of the end walls of the framework adjustable toward and away from the baling chamber to relieve the bale and permit ready removal of the same from the baling chamber.

Another feature of our invention consists in providing a rigid connection between the follower and the operating mechanism so as to positively prevent rocking of the follower during the baling operation.

The above and other objects and advantages of our invention will become apparent from a detailed description of the accompanying drawings in which, Figure 1 is a side elevation of a baler embodying our invention, certain of the parts being for the sake of clearness shown in cross sections; Fig. 2 is an end view of the baler taken substantially on line 2—2 of Fig. 1; Fig. 3 is a cross-sectional detail view substantially on 3—3 of Fig. 1; Fig. 4 is a longitudinal cross-sectional view of the operating mechanism at one end of the frame work; Fig. 5 is a fragmentary perspective view showing one member of a latch device for locking the adjustable end wall in normal position, and Fig. 6 is a fragmentary view in detail showing the other member of the latch device fixed to the adjustable end wall, this member being adapted to coöperate with the locking or latching member of Fig. 5.

In the particular embodiment shown in the drawings, the baler as a frame work provided with a base 1, side walls 2 and 3, and end walls 4 and 5. Ordinarily the side walls 2 and 3 are formed of vertical boards held together by horizontal cleats or cross bars 6. In the present instance we have shown the side wall 3 removable. Suitable fastening devices such as turn-buttons 7 hold the side wall 3 in place on the baler frame. The turn-buttons 7 are pivoted at 9 to the upper cross-bar 8 as shown in Fig. 1. As the left hand of this figure is in cross-section, only one of the turn buttons 7 is shown. On the base plate 1 rests the bottom member 10, to the top of which are secured transverse pieces 11 separated by spaces 12. These transverse pieces form the bottom of the baling chamber. The follower which operates in the baling chamber to compress the paper or other material, comprises a bar 13 which projects at its ends through the slot 14 in the end walls 4 and 5. To the bar 13 is secured a steadying member 15 which, in the embodiment illustrated is in the form of a plate or board projecting laterally upon either side of the bar 13. The compression member 16 of the follower is adapted to rest against the under side of the member 15 and is on its lower face provided with transverse pieces 17 separated from each other by spaces 18. From Fig. 1 it will be observed that the spaces 12 between the transverse pieces 11 at the bottom of the baling chamber are in alinement with the spaces 18. The object of the alined spaces 12 and 18 is to permit the baling wires to be properly arranged within the baling chamber. The horizontal portions of these wires rest in the upper and lower spaces 18 and 12. In the particular form illustrated in the drawings, the baling chamber is adapted to receive three baling wires.

The end walls 4 and 5 are each provided with a horizontal cross-bar 19 and a pair of vertical strips 20 secured upon either side of the slot 14. To each end wall is rigidly secured a rack device which comprises a pair of rack bars 21 and 21$^a$. The bolts or other fastening means 22 which firmly hold the rack bars in place on the end walls, pass through the reinforcing bars 19 and 20, as may be seen from Fig. 2. The rack bars at each end wall are arranged upon either side of the slot 14. The rack bar 21 is provided with a row or series of outer teeth 23 and a row or series of inner teeth 24. As best shown in Fig. 3, the rack bar 21 is provided with a recess 25 between the outer and inner rows of teeth. The companion rack bar 21ᵃ is provided with an outer row of teeth 23ᵃ and an inner row of teeth 24ᵃ. Between the two rows of teeth the rack bar 21ᵃ is provided with a recess 25ᵃ.

With each rack device is associated an operating bell crank which includes a handle bar 26 and a substantially L-shaped casting 27. The vertical arm 28 of the casting 27 is provided with an opening 29 into which fits the lower end of the handle bar 26. The horizontal arm 30 of the L-shaped casting 27 extends inwardly through the space between the associated pair of rack bars, and carries the pivot shafts 31 and 32 which extend at both ends beyond the arm. On the extended end of the shaft 31 are pivoted the two pawls 33 and 33ᵃ which are near their upper end connected together by the pins 34. As best shown in Fig. 3, the pawl 33 is arranged to engage the outer teeth 23 of the rack bar 21, while the pawl 33ᵃ is arranged to engage the outer teeth 23ᵃ of the rack bar 21ᵃ. On the extended end of shaft 32 are pivoted the pawls 35 and 35ᵃ which are near their upper end connected together by the cross-pin 36. As shown in Fig. 3, the pawl 35 is arranged to engage the inner teeth 24 of the rack bar 21, while the pawl 35ᵃ is arranged to engage the inner teeth 24ᵃ of the rack bar 21ᵃ. An expansion spring 37 is at one end connected to the cross-pin 34 and at the other end to the cross-pin 36 so as to normally hold the two pairs of pawls against the outer and inner teeth of the rack bars 21 and 21ᵃ.

From the above description it will be clear that when the operating bell cranks are rocked inwardly by means of the handle-bar 26 into the position indicated in dotted lines at 26ᵃ in Fig. 1, the outer pawls 33 and 33ᵃ of each bell crank firmly grip the associated outer teeth of the rack bars 21 and 21ᵃ and cause the bell crank to rotate about the shaft or pin 31 as a pivot. The horizontal arm 30 of the casting 27 is depressed at its inner end, and the inner pair of pawls 35 and 35ᵃ rides over the inner teeth of 24 and 24ᵃ, respectively into engagement with the next lower pair of teeth. When the handle-bars 26 are then moved outwardly, the operating bell-cranks are rocked about the pin or shaft 32. During this outward movement of the operating bell-cranks, the inner pawls firmly grip the inner teeth of the rack bars, while the outer pawls ride freely over the outer teeth 23 and 23ᵃ into engagement with the next lower teeth. It will thus be seen that by simply moving the handle-bars 26 toward and from each other the bell cranks are forced downwardly tooth by tooth.

The L-shaped casting 27 of each operating bell-crank carries a pin 38 to which are pivoted the lower ends of the inverted U-shaped connecting member 39. At their central portions the connecting members 39 engage the ends of the bar 13. As seen from Fig. 2, the U-shaped connecting members 39 embrace the bar 13 snugly so as to positively prevent rocking of the bar during the baling operation. The members 39 provide a simple and reliable connection between the follower and the operating mechanism. As the bell-cranks are rocked downwardly about the pin 31 or 32, it will be clear that the handle-bar 26 affords considerable leverage whereby a great downward pressure is produced upon the material in the baling chamber.

In order to permit the ready restoration of the operating bell-cranks to initial position, suitable means is provided for temporarily holding the pawls out of engagement with the teeth of the rack bars. In the specific construction shown in the drawings, this movement of the pawls to inoperative position is accomplished by means of a pair of bell-cranks 40 and 41 which extend through the slot 42ᵃ in the L-shaped casting 27 and are pivotally mounted on the pin or shaft 38. The bell-crank 40 is provided with an outwardly extending upper end 42, while the bell-crank 41 is provided with an inwardly extending upper end 43. The end 42 of the bell-crank 40 is adapted to engage the pin 34 of the outer pair of pawls, while the upper end 43 of the bell-crank 41 is adapted to engage the cross pin 36 of the inner pair of pawls. When the free ends of the levers 40 and 41 are pressed together, as shown in Fig. 4, the upper ends of the levers are moved away from each other and force the pawls out of engagement with the outer and inner teeth of the rack bars 21 and 21ᵃ. While the levers are held pressed together the L-shaped casting 27 may be lifted upwardly to initial position. The operating bell-cranks are then ready for the next baling operation.

In order to relieve a bale when it has been formed and to permit ready removal of the same from the baling chamber, we have provided the frame work with an adjustable end wall. In the particular structure illustrated the end wall 5 is at its lower end hinged to the base 1 of the baler by means of the hinges 44 and 45. Any suitable form of latch or locking device may be used for holding the end wall in normal position, which is the position indicated in full lines in Fig. 1. The specific latch device shown in the drawings consists of a pair of members 46 secured to the upper portion of the end wall 5 and extending beyond the end wall upon either side. With the latch members 46 coöperate the latch members 47 which are pivoted to the sides of the frame work at 48. The latch members 47 are each provided near their outer edge with a substantially L-shaped slot having a horizontal portion 49 and a short vertical portion 50. The latch members 46 are at their outer end provided each with head 51 connected to the body portion by a neck 52. When the neck rests in the vertical portion 50 of the L-shaped slot, the end wall 5 is positively locked against pivotal movement. To relieve a bale after it has been formed, the pivoted latch members 47 are grasped at their outer ends and rocked upwardly so as to disengage the neck 52 of the latch members 46 from the vertical portions 50 of the L-shaped slot. The pressure exerted against the end wall 5 by the bale forces the end wall outwardly about the hinges 44 and 45, as soon as the latch mechanism is released. Besides its simplicity and effectiveness, the latch mechanism shown and described has the additional advantage of limiting the outward movement of the end wall 5 by means of the horizontal portion 49 of the L-shaped slots in the latch members 47. The released position of the end wall 5 is indicated in dotted lines at 5ᵃ in Fig. 1.

Having thus described our invention what we claim as new and desire to secure by Letters Patent of the United States is:

1. In a baler, the combination of a frame work forming a baling chamber, a follower movable in said chamber, a pair of vertical racks secured to each end of the frame work, connecting members engaging the ends of the follower, a casting connected to the end of each member, four pawls carried by each casting and adapted to operatively engage the associated pair of racks to force the casting downwardly step by step, a lever movable in and out to operate said pawls and lower the follower, and means for holding said pawls out of engagement with the rack to permit raising of the castings to initial position.

2. In a baler, the combination of a frame work forming a baling chamber, a follower movable in said chamber, a pair of vertical racks secured to each end of the frame work, connecting members engaging the ends of the follower, an operating bell-crank associated with each pair of racks, four pawls carried by each bell-crank for engaging the teeth of the racks, and a handle movable in and out to cause movement of the bell-cranks step by step.

3. In a baler the combination of a frame work forming a baling chamber, a follower movable in said chamber, a pair of vertical racks secured to each end of the frame work, connecting members engaging the ends of the follower, a casting connected to the end of each member and having a slot, a pivot crossing said slot, a plurality of pawls carried by each casting and adapted to operatively engage the associated pair of racks to pull the casting downwardly step by step, a lever for operating each casting to lower the follower, and a pair of levers extending through the slot in each casting to move the pawls out of engagement with the rack when the levers are operated, so that the castings can be moved upwardly to initial position.

4. In a baler, the combination of a frame work forming a baling chamber, each end of the frame work having a slot, a follower adapted to move in said chamber and having end portions which project through said slots, a pair of racks secured to each end of the frame work on either side of the slot, said racks being each provided with outer and inner teeth, a substantially L-shaped casting associated with each pair of racks, two pairs of pawls pivoted to the horizontal portion of each casting, one pair of pawls engaging the outer teeth and the other pair of pawls engaging the inner teeth of the associated racks, a spring for normally holding said pawls against said teeth, a vertical member connected at its lower end to each of said castings and at its upper end adapted to engage one end portion of said follower, an operating lever connected to the vertical portion of each casting and movable in and out to rock the casting downwardly step by step, and a pair of bell-cranks pivoted to each casting for moving the pawls out of engagement with the teeth of the associated racks to permit raising of the casting to initial position.

5. In a baler, the combination of a frame work forming a baling chamber, each end of the frame work having a slot, a follower movable in said frame work and having end portions which extend through said slots, a pair of inverted U-shaped metallic bars adapted to engage the end of the follower at their central portion, and actuating mechanism connected to the lower ends of said U-shaped bars and arranged to pull the follower downwardly.

6. In a baler, the combination of a frame work forming a baling chamber, each end of the frame work having a slot, a follower movable in said frame work, having end portions which extend through said slots, a pair of inverted U-shaped metallic bars adapted to engage the ends of the follower at their central portion, an operating bell crank to which the lower ends of each U-shaped bar are connected, pawls carried by each bell-crank, and rack mechanism secured to each end of the framework and adapted to be engaged by said pawls, whereby said bell-cranks may be rocked downwardly step by step to pull the follower downward.

7. In a baler, the combination of a frame work forming a baling chamber, each end of the frame work having a slot, a bar having end portions projecting through said slots, a flat compression member adapted to rest loosely against the under face of said bar, steadying means secured to said bar and extending laterally from each side of the bar to engage said compression member so as to prevent rocking thereof during the baling operation, a pair of inverted U-shaped metallic members adapted to engage the ends of said bar at their central portion, and actuating mechanism to which the lower ends of the U-shaped members are connected to pull the follower downwardly.

In witness whereof, we hereunto subscribe our names this 1st day of March A. D. 1911.

ALBERT E. BEALL.
CHARLES F. SKELLENGER.

Witnesses:
HENRY B. RICHARDSON,
M. G. MULLIGAN.

Copies of this patent may be obtained for five cents each, by addressing the "Commissioner of Patents, Washington, D. C."